US005954626A

United States Patent [19]

Hlavinka

[11] Patent Number: 5,954,626

[45] Date of Patent: Sep. 21, 1999

[54] METHOD OF MINIMIZING CORIOLIS EFFECTS IN A CENTRIFUGAL SEPARATION CHANNEL

[75] Inventor: Dennis Hlavinka, Arvada, Colo.

[73] Assignee: Cobe Laboratories, Inc., Lakewood, Colo.

[21] Appl. No.: 08/897,056

[22] Filed: Jul. 18, 1997

Related U.S. Application Data

[62] Division of application No. 08/648,503, May 15, 1996, Pat. No. 5,792,038.

[51] Int. Cl.[6] .......... B01D 43/00

[52] U.S. Cl. .......... 494/37

[58] Field of Search .......... 494/1, 17, 18, 494/21, 23, 27, 35, 37, 43, 45, 85; 210/781, 782

[56] References Cited

U.S. PATENT DOCUMENTS

| | | | |
|---|---|---|---|
| 2,616,619 | 11/1952 | MacLeod . | |
| 3,825,175 | 7/1974 | Sartory . | |
| 4,010,894 | 3/1977 | Kellogg et al. . | |
| 4,091,989 | 5/1978 | Schlutz . | |
| 4,094,461 | 6/1978 | Kellogg et al. . | |
| 4,146,172 | 3/1979 | Cullis et al. | 494/17 |
| 4,187,979 | 2/1980 | Cullis et al. . | |
| 4,322,298 | 3/1982 | Persidsky . | |
| 4,350,283 | 9/1982 | Leonian . | |
| 4,356,958 | 11/1982 | Kolobow et al. . | |
| 4,386,730 | 6/1983 | Mulzet . | |
| 4,387,848 | 6/1983 | Kellogg et al. . | |
| 4,419,089 | 12/1983 | Kolobow et al. . | |
| 4,425,112 | 1/1984 | Ito . | |
| 4,447,221 | 5/1984 | Mulzet . | |
| 4,647,279 | 3/1987 | Mulzet et al. . | |
| 4,675,117 | 6/1987 | Neumann et al. . | |
| 4,708,710 | 11/1987 | Dunn, Jr. . | |
| 4,708,712 | 11/1987 | Mulzet . | |
| 4,798,579 | 1/1989 | Penhasi . | |
| 4,934,995 | 6/1990 | Cullis . | |
| 4,936,820 | 6/1990 | Dennehey et al. . | |
| 4,939,087 | 7/1990 | Van Wie et al. . | |
| 5,006,103 | 4/1991 | Bacehowski et al. . | |
| 5,078,671 | 1/1992 | Dennehey et al. . | |
| 5,217,427 | 6/1993 | Culllis . | |

(List continued on next page.)

FOREIGN PATENT DOCUMENTS 0 363 120 2/1989 European Pat. Off. .

OTHER PUBLICATIONS

Robert J. Grabske, Separating Cell Populations by Elutriation, pp. 1–8.

AS 104 Cell Separator, Fresenius.

CS–3000 Blood Cell Separator, Powerful Technology, Fenwal Laboratories.

J.F. Jemionek, Variations in CCE Protocol for Cell Isolation, Elutriation, pp. 17–41.

Multi Chamber Counterflow Centrifugation System, Dijkstra Vereenigde B.V., 6 pgs.

Brief Operating Instructions, Fresenius MT AS 104 blood cell separator, 4/6.90 (OP).

*Primary Examiner*—Charles E. Cooley
*Attorney, Agent, or Firm*—Finnegan, Henderson, Farabow, Garrett, & Dunner L.L.P.

[57] ABSTRACT

A centrifuge separation device is disclosed and includes a rotor configured to be connected to a centrifuge motor for rotation about an axis of rotation. A retainer is associated with the rotor and defines a passageway for a separation channel. A protrusion formed in one of the passageway walls extends towards and is spaced from the other of the passageway walls. The protrusion is sized to substantially block passage of materials in a predetermined density range and to substantially permit passage of materials outside of the predetermined density range. An indentation formed adjacent the protrusion in a wall of the passageway opposite the protrusion is configured to trap fluid during rotation of the rotor and to cooperate with the trapped fluid to maintain a substantially Coriolis-free pathway in a region of the passageway adjacent the protrusion.

13 Claims, 7 Drawing Sheets

U.S. PATENT DOCUMENTS

| | | |
|---|---|---|
| 5,316,666 | 5/1994 | Brown et al. . |
| 5,316,667 | 5/1994 | Brown et al. . |
| 5,360,542 | 11/1994 | Williamson, IV et al. . |
| 5,362,291 | 11/1994 | Williamson, IV . |
| 5,370,802 | 12/1994 | Brown . |
| 5,571,068 | 11/1996 | Bacehowski et al. . |
| 5,607,830 | 3/1997 | Biesel et al. . |
| 5,641,414 | 6/1997 | Brown . |
| 5,704,889 | 1/1998 | Hlavinka et al. . |

METHOD OF MINIMIZING CORIOLIS EFFECTS IN A CENTRIFUGAL SEPARATION CHANNEL

This is a divisional of application Ser. No. 08/648,503, filed May 15, 1996, U.S. Pat. No. 5,792,038.

BACKGROUND OF THE INVENTION

1. Field of the Invention

The present invention relates to an apparatus and method for reducing turbulence during centrifugal separation of substances. The invention has particular advantages when used in connection with separating blood components using a centrifugal separation channel.

2. Description of the Related Art

U.S. Pat. No. 4,425,112 to Ito, U.S. Pat. No. 4,708,712 to Mulzet, U.S. patent application Ser. Nos. 08/423,578 and 08/423,583, filed Apr. 18, 1995, and U.S. patent application Ser. No. 08/634,167, filed Apr. 18, 1996 (pending), all of which are incorporated herein by reference, disclose a centrifuge used in connection with a tubular blood separation channel. In addition, the following U.S. patent applications identified by serial number, all filed on Jun. 7, 1995, are incorporated herein by reference: 08/480,617; 08/482,285; 08/483,574; 08/484,209; 08/486,012; and 08/504,049. As the channel is spun by the centrifuge, blood flowing through the channel is stratified into components, and ideally each component is then separately withdrawn from the channel through one of a number of outlets in the channel.

In addition to centrifugal forces, other mechanisms may aid in separating blood components in the channel. For example, a groove or passageway in the centrifuge rotor which holds and defines the shape of the channel during rotation, may be formed with sections of varying radii. These changes in radii control flow of particles having varying densities. Components with higher densities will tend to migrate to areas of greater radius.

Another mechanism that may be used to aid in separating components is a dam in the channel. If the dam radially extends from an outer wall of the channel towards the inner wall, it will prevent particles with higher densities from migrating past the dam while permitting lower density particles and liquid to pass between a peak of the dam and the inner wall of the channel. The opposite effect can be achieved by extending a dam from the inner wall of the channel toward the outer wall.

Dams are preferably formed by a protrusion in the channel-holding groove of a centrifuge rotor. When the tubular channel is placed in the groove, the channel conforms to the shape of the groove, and any protrusions in the groove will cause a corresponding dam in the channel.

In one configuration used in connection with separating components of whole blood, the dam may be dimensioned along the entire depth of an outer wall of the channel to prevent red blood cells and white blood cells from flowing past the peak of the dam, while permitting lower density platelets and plasma to pass. A platelet outlet may be arranged in the outer wall of the channel downstream of the dam to collect and separate the platelets from the plasma. This platelet separation occurs because platelets, which have a higher density than plasma, are forced radially outward in the rotating channel, relative to the plasma.

One inefficiency with such an arrangement is that fluid flow over the peak of the dam causes the radial position of platelets and plasma to abruptly change. As the plasma and platelets encounter the dam, their flow is suddenly diverted towards the inner wall of the channel. Once they pass the dam, they sediment outwardly. Such flow condition changes result in "Coriolis" accelerations and decelerations, which in turn cause fairly aggressive mixing of the platelets and plasma to take place. This mixing is counterproductive in a system whose goal is to separate components of flow, and therefore mixing reduces the efficiency of the system.

By mixing platelets and plasma at the outer wall dam, Coriolis effects within the separation channel disadvantageously increase the length of a blood component separation procedure. Reducing blood component separation time is most desirable not only from an economic perspective, but also from a convenience perspective to the donors, who are typically volunteers. The longer the duration of a platelet collection session, the greater the inconvenience to the donor. In addition, when an immediate transfusion is necessary, time may be of the essence.

SUMMARY OF THE INVENTION

The present invention is directed to an apparatus and method that substantially obviates one or more of the limitations and disadvantages of the related art. To achieve these and other advantages, and in accordance with the purposes of the invention as embodied and broadly described herein, the invention includes a centrifugal separation device having a rotor configured to be connected to a centrifuge motor for rotation about an axis of rotation. A retainer on the rotor includes a first barrier in one wall and a second barrier in a wall opposite the first barrier. The first barrier may be a protrusion and the second barrier an indentation. When the rotor is rotated during a priming stage, the indentation traps a priming fluid thereby forming a fluid dome opposite the protrusion.

In use, the dome cooperates with the indentation, effectively forming a self-adjusting flow boundary that results in a substantially Coriolis-free pathway for fluid flowing in a region of the channel adjacent the protrusion.

The invention has particular advantages when used to separate whole blood components. In such use, a channel is placed in the retainer. A dam may be formed in an outermost wall of the channel, and an indentation may be formed in the innermost wall of the channel. The dam serves to block the flow of higher density red and white blood cells, which are forced radially outwardly and have difficulty migrating over the peak of the protrusion. Lower density plasma and platelets, on the other hand, stratify radially inward from the red blood cells, permitting them to pass the dam.

The fluid dome, which may be formed of saline, creates a Coriolis-free pathway that minimizes re-mixing of platelets and plasma that have already separated from each other due to density differences. In the channel downstream from the dam, a platelet well is formed to collect the separated platelets.

According to the invention, protrusions and indentations may be used on either wall of the retainer, depending upon the use to which the separator is applied.

The invention may also include a method of minimizing Coriolis effects in a centrifugal separation channel. The method includes the steps of introducing a priming fluid into the separation channel, rotating the separation channel to trap a portion of priming fluid behind the second barrier, and then using the trapped portion to form a substantially Coriolis-free flow path.

According to another aspect of the invention, the inner wall of the passageway has a substantially constant radius in an area adjacent the first barrier. When used in connection with blood separation, it may be advantageous to maintain this constant inner radius from a location where red blood cells are introduced into the channel to a location after a point where platelets are removed.

It is to be understood that both the foregoing general description and the following detailed description are exemplary only, and are intended to provide further explanation of the invention as claimed. The accompanying drawings are included to provide a further understanding of the invention and are incorporated in and constitute a part of the specification. The drawings illustrate embodiments of the invention, and together with the description, serve to explain the principles of the invention.

DESCRIPTION OF THE PREFERRED EMBODIMENTS

Reference will now be made in detail to the present preferred embodiments of the invention illustrated in the accompanying drawings. While the following description discusses the invention in connection with separating components of blood, it is to be understood that the invention, in its broadest sense, is not so limited. The invention has broad industrial and medical applications.

A preferred embodiment of the present invention is described by referring to its use with a COBE® SPECTRA™ two stage sealless blood component centrifuge manufactured by the assignee of the invention. The COBE® SPECTRA™ centrifuge incorporates a one-omega/two-omega sealless tubing connection as disclosed in the above-mentioned U.S. Pat. No. 4,425,112 to Ito. The COBE® SPECTRA™ centrifuge also uses a two-stage blood component separation channel substantially as disclosed in the above-mentioned U.S. Pat. No. 4,708,712 to Mulzet. Although the preferred embodiment of the invention is described in combination with the COBE® SPECTRA™ centrifuge, this description is not intended to limit the invention in any sense.

As will be apparent to one having skill in the art, the present invention may be advantageously used in a variety of centrifuge devices commonly used to separate blood into its components. In particular, the present invention may be used with any centrifugal apparatus that employs a component collect line such as a platelet collect line or a platelet rich plasma line, whether or not the apparatus employs a two stage channel or a one-omega/two-omega sealless tubing connection.

Figure 1:
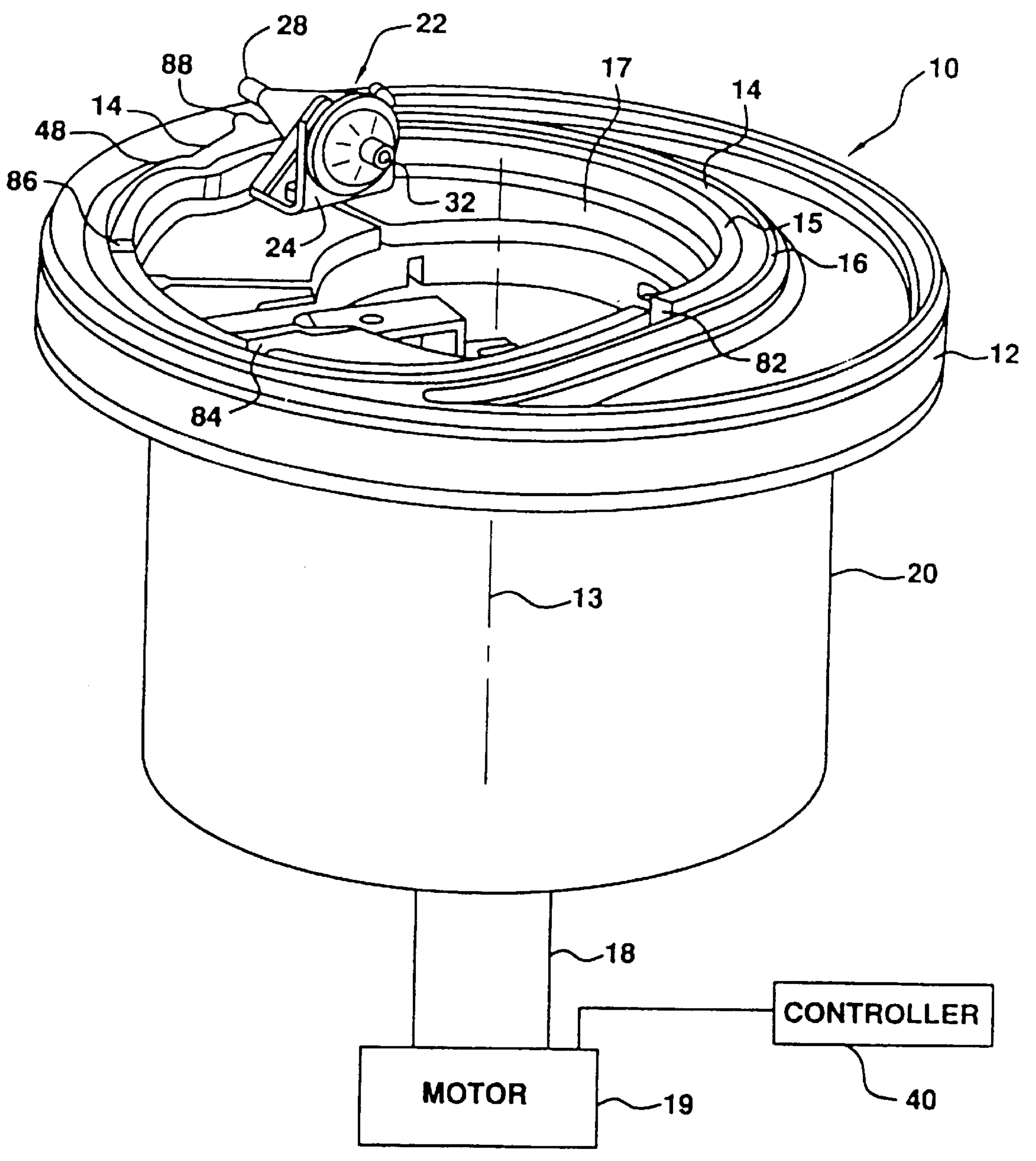
FIG. 1 is a perspective view of a centrifuge apparatus in accordance with the invention.

In accordance with the invention, there is provided a centrifugal separation device including a rotor configured to be connected to a centrifuge motor for rotation about an axis of rotation. As embodied herein, and as illustrated in FIG. 1, centrifuge 10 includes a disc-shaped filler plate or rotor 12. A motor 19 is coupled to rotor 12 to rotate the rotor 12 about an axis of rotation 13. This coupling is accomplished directly or indirectly through a shaft 18 connected to the rotor 12. Alternately, the shaft 18 may be coupled to the motor 19 through a gearing transmission (not shown). A shroud 20 is positioned on the rotor 12 to protect the motor 19 and shaft 18.

The rotor 12 may also include bracket 24 for maintaining a fluid chamber 22 on rotor 12 with a chamber outlet 32 generally positioned closer to the rotation axis 13 than a chamber inlet 28. Various embodiments of the construction and use of fluid chamber 22 are described in the above-mentioned U.S. patent applications. A controller 40 may be provided to vary the rotational speed of the centrifuge rotor 12 by regulating frequency, current, or voltage of the electricity applied to the motor 19. Alternatively, the rotor speed can be varied by shifting the arrangement of a transmission (not shown), such as by changing gearing to alter a rotational coupling between the motor 19 and rotor 12. The controller 40 may receive input from a rotational speed detector (not shown) to constantly monitor the rotor speed.

Figure 2:
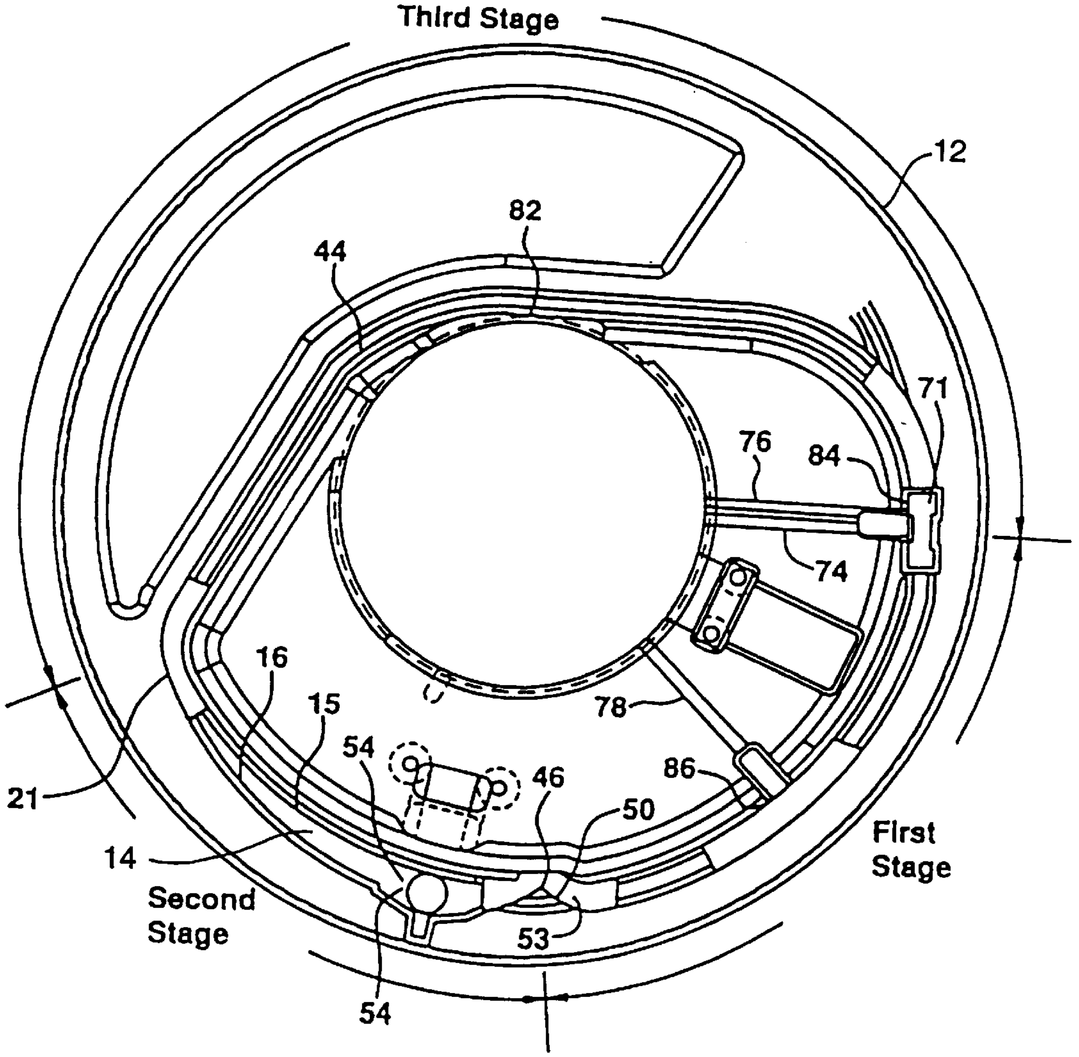
FIG. 2 is a top view of the centrifuge apparatus depicted in FIG. 1.
Figure 6:
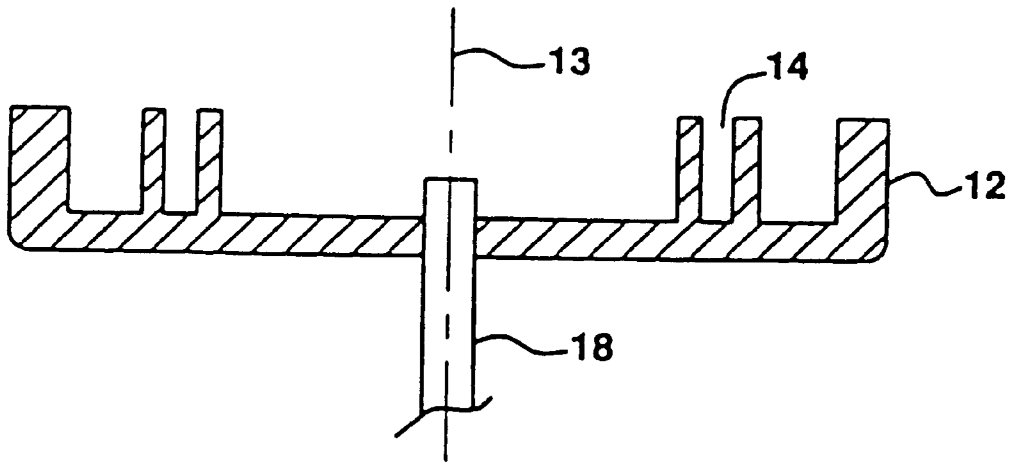
FIG. 6 is a schematic cross-sectional view of the rotor illustrated in FIG. 1.

In accordance with the invention, there is provided a retainer associated with the rotor and rotatable therewith, the retainer having an innermost wall spaced from the axis of rotation and an outermost wall located farther from the axis of rotation than the innermost wall, whereby the innermost wall and the outermost wall define a passageway therebetween. As illustrated in FIGS. 1, 2, and 6, the retainer includes an annular groove or passageway 14 in rotor 12. The passageway 14 may be U-shaped in cross-section and adapted to receive a conduit or channel 44 of a tubing set 70, such as the semi-rigid plastic tube shown in FIG. 4. The passageway 14 surrounds the rotor's axis of rotation 13 and is defined by a radially innermost wall 15 and a radially outermost wall 16. Both walls 15 and 16 extend through a top surface 17 of rotor 12.

Figure 7:
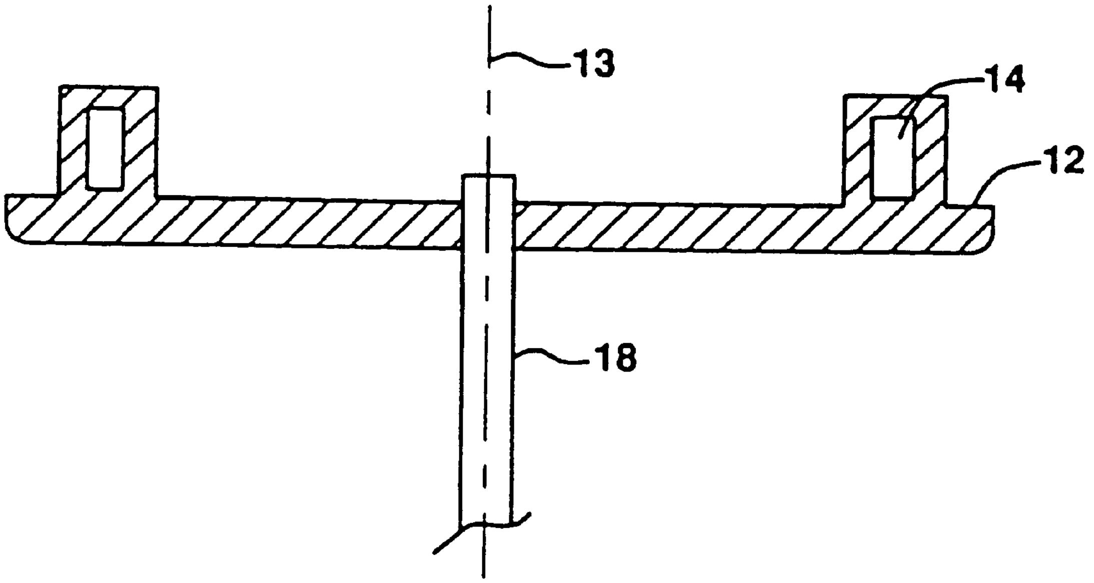
FIG. 7 is a schematic cross-sectional view of a rotor in accordance with an alternate embodiment of the present invention.

While in preferred embodiments of the invention the retainer is a groove 14 formed in rotor 12, any structure that forms a fixed passageway about the rotation axis 13 may be used. For example and as illustrated in FIG. 7, the passageway 14 may be configured with a closed rather than U-shaped cross-section in order to directly receive fluid flow in lieu of being lined by the conduit 44.

As illustrated in FIG. 2, passageway 14 may be divided into three stages, each associated with collection of different blood components. A first stage extends from a groove 84 for a T-shaped connector 71 to a ridge 46 described in more detail below. This region is configured to collect red and white blood cells through outlet line 74. The second stage extends from ridge 46 to just before elbow 21. This region is configured to have a substantially constant inner wall radius forming a Coriolis-free path and for collecting platelets in collect well 54. The third stage, which extends from elbow 21 to just before groove 84, is configured so that plasma may be collected through outlet line 72, received in slot 82. Preferably the radius of passageway 14 along innermost wall 15 decreases in the first stage, is substantially constant in the second stage, decrease in a portion of the third stage from elbow 21 to plasma collect slot 82, and increases in a portion of the third stage from slot 82 to groove 84. A preferred thickness of the rotor 12 is 1.440 inches with a channel depth of 1.3 inches.

When used in connection with blood component separation, it is preferable that the platelet collection well 54 is downstream (relative to direction of plasma flow) from a dam 50 formed by ridge 46 in channel 44. In a portion of the second stage upstream of elbow 21, the outermost wall 16 of passageway 14 steeply slopes toward the outlet of well 54 for enhancing platelet collection.

Figure 3:
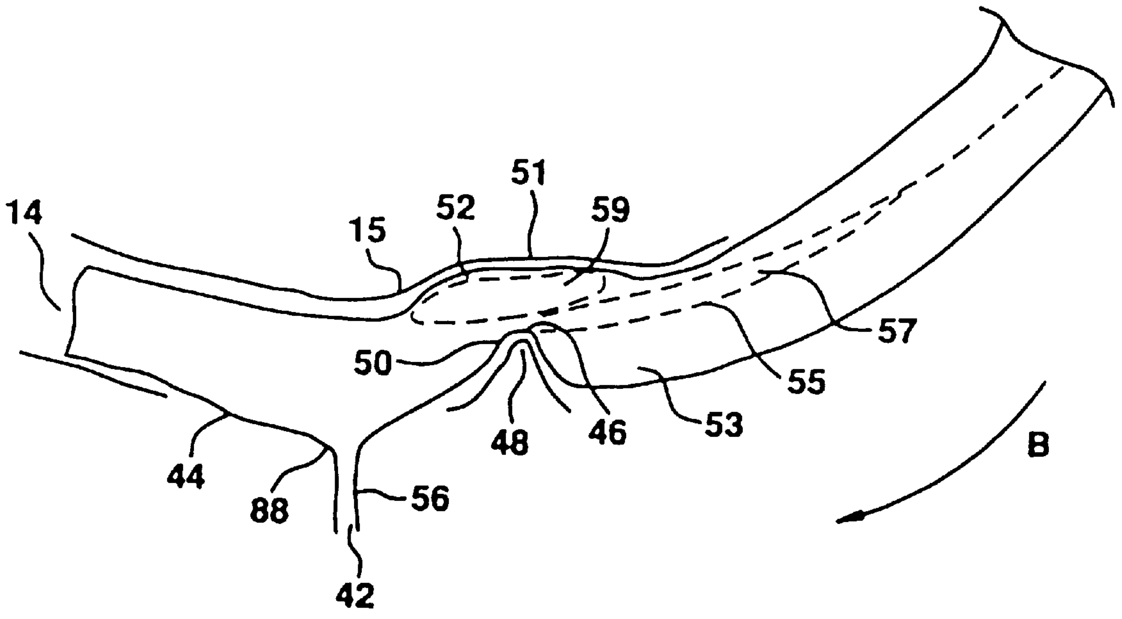
FIG. 3 is a detailed top view of a portion of the centrifuge apparatus of FIG. 2.

Also in accordance with the invention there is provided a first barrier formed in one of the passageway walls and extending toward and being spaced from the other of the passageway walls, the first barrier being sized to substantially block passage of materials in a first predetermined density range, and to substantially permit passage of materials outside of the predetermined density range. As embodied herein, and as best illustrated in FIG. 3, the ridge 48 forms a protrusion positioned on the outermost wall 16 of passageway 14. When channel 44 of tubing set 70 is positioned within passageway 14, ridge 48 deforms a portion of the channel 44 to form dam 50 within the channel 44. The size of ridge 48 may vary depending upon desired use. When used in connection with separation of blood components, ridge 48 may be sized, as shown in FIG. 3, to block passage of red and white blood cells and to permit passage of platelets and plasma. The mechanisms that provide for such selective passage of materials will be discussed in greater detail later in connection with the method of use of the invention.

In accordance with the invention there is provided a second barrier formed in a wall of the retainer opposite the wall containing the first barrier, the second barrier being configured to block passage of fluid in a second density range to thereby maintain a substantially Coriolis-free pathway in a region of the passageway adjacent the first barrier. As best shown in FIG. 3, the innermost wall 15 of passageway 14 includes an indentation 51 positioned therein opposite ridge 48. When channel 44 of tubing set 70 is inserted into passageway 14, a portion of channel 44 extends into indentation 51, forming a pocket 52 in channel 44, opposite dam 50. As will be discussed later in greater detail, pocket 52 is sized to trap a low density fluid, such as saline or platelet poor plasma, during a priming procedure. This low density fluid forms a dome 59 in pocket 52 adjacent dam 50. The dome, which remains in pocket 52 during a separation procedure, effectively serves as a self-adjusting innermost flow boundary of the channel 44 opposite the dam 50. With this self-adjusting flow boundary, it is possible to maintain a substantially Coriolis-free pathway as fluid flows over the peak of dam 50, as is discussed later in greater detail.

In lieu of employing ridge 48 and indentation 51 in passageway 14 of rotor 12, dam 50 and pocket 52 may be permanent structures mounted within the flow passage of the channel 44. Although only a single dam 50 and pocket 52 are depicted in the figures, the flow passage may have multiple dams and pockets depending upon desired use. Likewise, while the figures depict a dam in the outermost wall 16 and a corresponding indentation in the innermost wall 15, the location of the dam and pocket may be reversed depending upon desired use.

Figure 8:
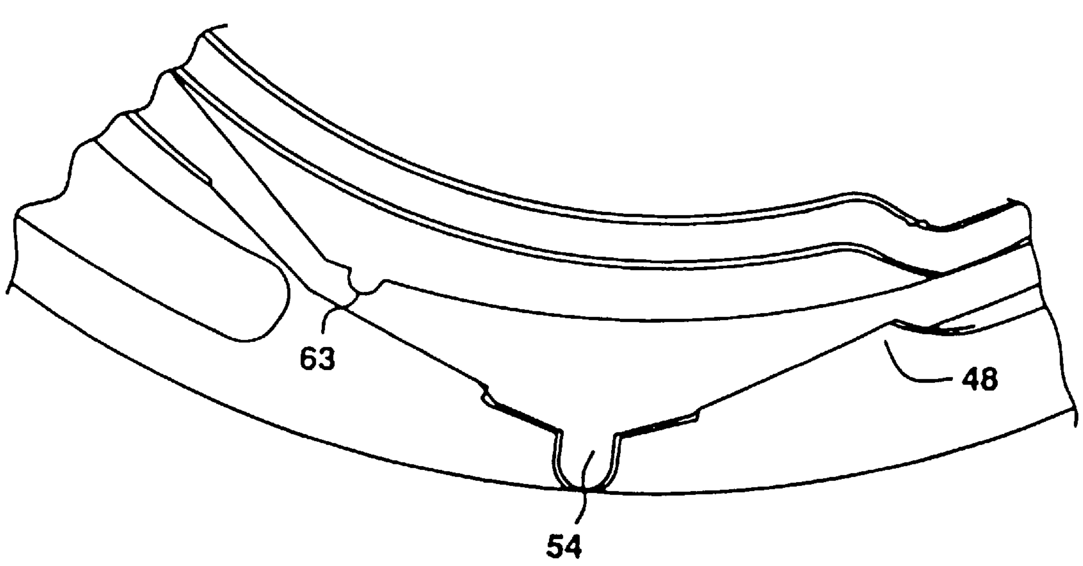
FIG. 8 is a partial top view of a further embodiment of the present invention.

In addition, the second barrier need not be an indentation in the innermost wall. It may be any type of blocking structure. As illustrated in FIG. 8, for example, the second barrier may be a protrusion 63 extending from the innermost wall and behind which a low density fluid becomes trapped. Similarly, the first barrier need not be a protrusion but, like the second barrier, may be any type of blocking structure.

A method of minimizing Coriolis forces in a centrifugal separator channel is discussed below with reference to the previously described structure.

In accordance with the method of the invention, there is provided the step of introducing a priming fluid into a separator channel, the channel defining a fluid flow path and having a first barrier extending into the flow path and a second barrier in a channel wall opposite the first barrier. As discussed earlier in connection with the apparatus of the invention, the separator channel 44 is inserted in passageway 14 of rotor 12, as illustrated in FIG. 1, or the channel 44 and passageway 14 may be combined as a single element as illustrated in cross-section in FIG. 7. In a preferred embodiment, the passageway 14 retains channel 44 of tubing set 70.

Figure 4:
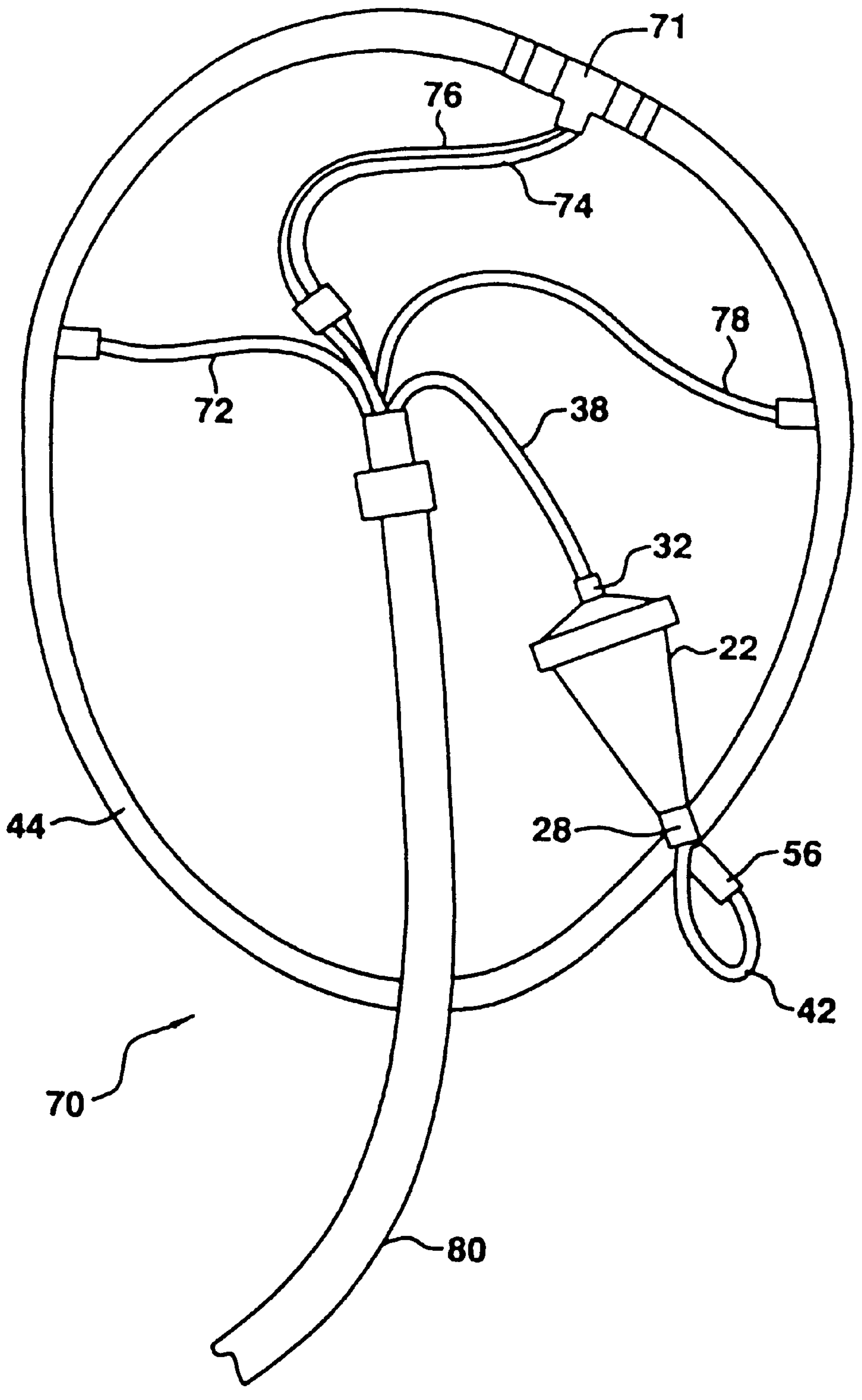
FIG. 4 is a perspective view of a tubing set for use with the invention.

As best illustrated in FIG. 4, tubing set 70 preferably includes a semi-rigid conduit formed into a channel 44 having a generally rectangular cross-section. T-shaped connector 71 joins ends of the channel 44 to form an annular or loop shape that fits within passageway 14. A supply line 78 provides whole blood to an inlet of the semi-rigid channel 44, while a tubing segment 42, outlet lines 72, 74, and a control line 76 allow for removal of blood components during a centrifuge operation and flow control within the channel 44. Further details of the general configuration and functioning of the channel 44, tubing segment 42, and lines 72, 74, 76 and 78 are described in U.S. Pat. No. 4,708,712 to Mulzet.

A protective sheath 80 surrounds the lines 72, 74, 76, 78 and outflow tubing 38. When the channel 44 of the tubing set 70 is removably positioned within the passageway 14, the lines 72, 78, 74 and 76 extend through slots 82, 86 and groove 84, respectively, formed in innermost wall 15. The outlet tubing 42 rests in a slot 88 formed in outermost wall 16 (See FIGS. 1 and 3). A more complete discussion of tubing set 70 is included in the above-mentioned co-pending applications.

Channel 44 is primed by introducing into channel 44 a priming fluid including at least a low density component that is capable of becoming entrapped by the second barrier. This priming fluid is preferably saline solution, but may also be blood. Priming fluid may be introduced through inlet line 78 and withdrawn through one or more of outlet lines 42, 72, 74, and 76.

In accordance with the invention, there is also provided the step of rotating the separator channel to trap a portion of the priming fluid behind the second barrier. As embodied herein, the step of rotating includes turning rotor 12 about axis 13. This turning may be achieved by controller 40, which initiates operation of the motor 19 to rotate the centrifuge rotor 12 and fluid chamber 22 in the direction of arrow "B" in FIG. 3. In alternative embodiments, the motor 19 may rotate the rotor 12 and fluid chamber 22 in the opposite direction. Of course, rotation is properly defined by reference to the direction of platelet flow from the whole blood inlet to the platelet outlet. Rotation can occur in either direction and still be within the scope of the invention. During rotation, twisting of fluid lines 72, 74, 76, 78 and outflow tubing 38 connected to the centrifuge rotor 12 and fluid chamber 22 is prevented by a sealless one-omega/two-omega tubing connection as is known in the art and described in U.S. Pat. No. 4,425,112 to Ito.

During priming and rotation of rotor 12, a pocket of low density fluid, which, in the case of a blood separation process, may be saline or platelet poor plasma derived from blood, becomes trapped in pocket 52 of channel 44. This trapping occurs because the pocket 52 is recessed toward the axis of rotation 13. The rotor speed and density of the priming fluid are such that when blood pushes the priming fluid out of the passageway, the priming fluid in pocket 52 is unable to escape. As a result, a dome 59 of priming fluid forms opposite the dam 50. As shown in FIG. 3, the indentation 51 and the protrusion 48 are sized such that the dome 59 extends from the innermost wall 15 to the top of dam 50, contacting the peak of the dam 50. Alternatively, the fluid dome 59 may extend just slightly below or above the top of the dam 50. Upstream of the dam 50, a bed 53 containing red and white blood cells is formed by dam 50. A platelet well 54 is formed downstream of the dam 50. Preferably, the dome extends over at least a portion of the blood cell bed 53 and the well 54.

In accordance with the invention there is also provided the step of introducing into the channel a separation fluid. When used in connection with a blood component separation process, the separation fluid (i.e. the fluid whose components are to be separated) is whole blood provided to channel 44 through supply line 78. All of the components of whole blood have densities greater than the density of saline solution. Therefore, if saline solution is used to form the dome 59, all of the blood components will be centrifugally forced radially outward from the dome 59 as they flow in channel 44. If blood is used as the priming fluid, platelet poor plasma, the least dense component of blood, will form dome 59. As used herein, the term platelet poor plasma may include plasma carrying anywhere from zero to 700,000 platelets per cubic millimeter of plasma. However, the upper end of this range depends upon the concentration of platelets in the donors blood. Lower concentrations of platelets in the dome are preferable.

As mentioned earlier, dam 50 is sized to substantially prevent the passage of red and white blood cells. Thus, as depicted by the boundary line 55 in FIG. 3, the red and white blood cells remain trapped behind dam 50, backing up from dam 50 all the way to groove 84 (FIG. 2) where they are withdrawn through outlet line 74 (FIG. 2). Platelets and plasma, which have lower densities than red and white blood cells, stratify above the bed 53, as indicated by boundary line 57 in FIG. 3, and pass over the peak of dam 50. Once the platelets and plasma pass the dam 50, the higher density platelets migrate radially outward into platelet collection well 54 for removal through collection line 56. The outer wall of collection well 54 has a significant slope causing platelets that pass well 54 to migrate back towards the well. At the beginning of the third stage, the radius of innermost wall 15 of passageway 14 decreases dramatically as the passageway approaches slot 82, where plasma is removed through outlet line 72.

In accordance with the invention, there is provided the step of causing the separation fluid to flow past the first barrier and the second barrier while the portion of the priming fluid remains trapped behind the second barrier so that the trapped portion cooperates with the second barrier to form a substantially Coriolis-free path for the separation fluid. As embodied herein, an outer edge of the dome 59 forms an inner flow boundary, thereby maintaining a constant inner radial guide for plasma and platelets to flow along as they pass dam 50. Fluid flowing along a path of constant radius with respect to the center of rotation does not experience Coriolis accelerations and decelerations. Therefore, by providing the constant inner radial boundary, a Coriolis-free pathway is formed.

The constant inner radial boundary serves to limit re-mixing of the platelets and plasma, which would otherwise occur if the radial orientation of the platelets and plasma were to change as they passed the dam. Re-mixing is limited because the dome 59 effectively acts as a self-adjusting "wall" minimizing radial movement of passing plasma and platelets. In other words, the constant radius inner wall of the second stage is sized substantially identical to the outer radius of the dome. The plasma and platelets flowing over the dam 50 push just enough of the dome 59 out of the way to enable flow over the dam 50 while still maintaining a substantially constant radial orientation. Thus, regardless of the volume of platelets and plasma flowing over the peak of the dam 50, the dome 59 will automatically adjust to accommodate varying volumes while maintaining a substantially Coriolis-free pathway.

Since the dome 59 also reduces the effective passageway volume in an area of the dam 50, the dome 59 induces higher plasma and platelet velocities in the first stage. Those higher velocities scrub sedimented platelets off of the cell bed 53, which further increases the efficiency of separation.

Figure 5:
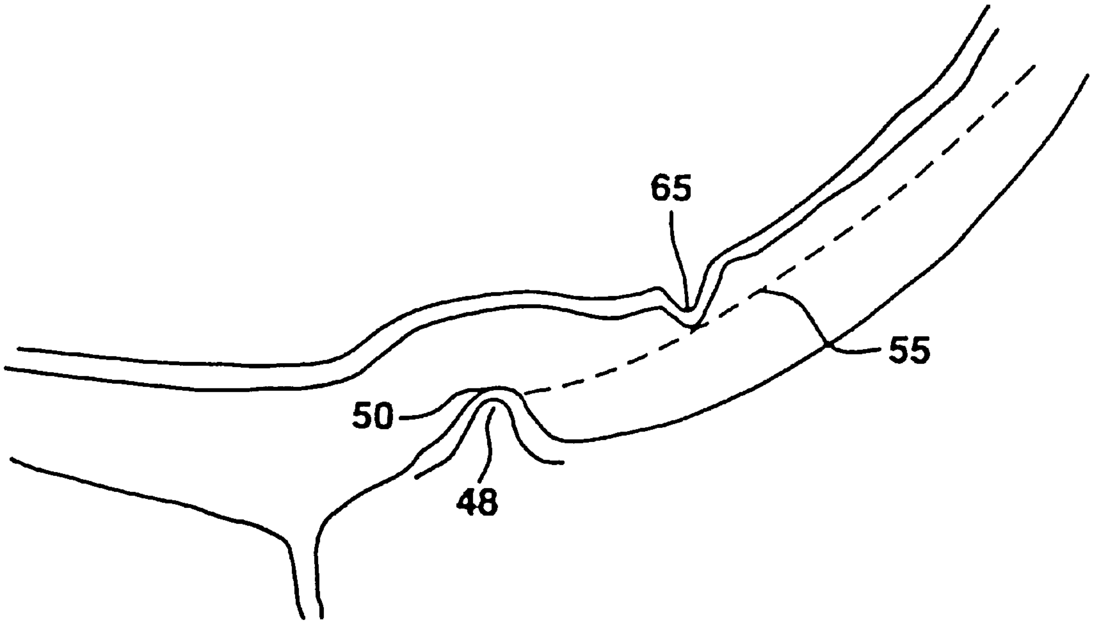
FIG. 5 is a detailed top view of a variation of FIG. 3 in accordance with the invention.

If even higher velocities to further enhance scrubbing is desired, an additional inner wall dam 65 may be provided upstream of dam 50 as illustrated in FIG. 5. Dam 65 reduces the amount of space available for flow of plasma and platelets, thereby increasing their flow velocities upstream of dam 50.

During a blood component separation procedure, the priming fluid forming the dome 59 may eventually be replaced by other fluids such as low density platelet pore plasma flowing in channel 44. Even when this replacement occurs, a fluid dome 59 is still maintained above the dam 50.

As with the apparatus of the invention, the method is described in connection with a blood component separation process, and as with the apparatus, it should be understood that the method of invention in its broadest sense is not limited to blood component separation. It has wide ranging industrial and medical applications.

In addition, the invention is applicable to both double needle and single needle blood processing applications. For example, the invention may be practiced with the SINGLE NEEDLE RECIRCULATION SYSTEM FOR HARVESTING BLOOD COMPONENTS of U.S. Pat. No. 5,437,624, the disclosure of which is incorporated herein by reference.

It will be apparent to those skilled in the art that various modifications and variations can be made to the structure and method of the present invention without departing from the scope or spirit of the invention. In view of the foregoing, it is intended that the present invention covers modifications and variations of this invention provided they come within the scope of the following claims and their equivalence.

What is claimed is:

1. A method of minimizing Coriolis effects in a centrifugal separator channel, the method comprising the steps of:

introducing a priming fluid into the separator channel, the channel defining a fluid flow path and having a first barrier extending into the flow path and a second barrier in a channel wall opposite the first barrier;

rotating the separator channel to trap a portion of the priming fluid behind the second barrier;

introducing a separation fluid into the channel;

causing the separation fluid to flow past the first barrier and the second barrier while the portion of the priming fluid remains trapped behind the second barrier so that the trapped portion cooperates with the second barrier to form a substantially Coriolis-free path for the separation fluid.

2. The method of claim 1 wherein the priming fluid is saline solution.

3. The method of claim 1 wherein the priming fluid includes platelet poor plasma.

4. The method of claim 1 wherein both the priming fluid and the separation fluid include blood components.

5. The method of claim 1, wherein the trapped portion of priming fluid forms a fluid dome adjacent the first barrier such that an edge of the dome contacts the first barrier.

6. The method of claim 5 further comprising the step of causing the edge of the dome to adjust with respect to the first barrier to accommodate varying flow volumes past the first barrier.

7. The method of claim 1 wherein the first barrier is a dam extending into the flow path, and the second barrier is an indentation in the channel wall opposite the dam.

8. The method of claim 1 further comprising the step of blocking with the first barrier flow of material having a density that differs from densities of both the priming fluid and the separation fluid.

9. The method of claim 1 wherein the first barrier extends from an outermost channel wall and the separation fluid includes plasma and platelets.

10. The method of claim 1 wherein the channel defines a blood cell bed on one side of the first barrier and a platelet well on an opposite side of the first barrier.

11. The method of claim 1 wherein the priming fluid cooperates with the second barrier during rotation of the channel to form a self-adjusting inner channel wall boundary of substantially constant radius.

12. The method of claim 11 wherein the channel is used for separating blood components, and the inner channel wall boundary of substantially constant radius extends from a location in the channel where red blood cells are introduced to a location beyond an area where platelets are removed.

13. The method of claim 1 wherein during rotation of the channel the trapped portion of priming fluid is replaced with another fluid.

* * * * *